US009185256B2

(12) United States Patent
Sato (10) Patent No.: US 9,185,256 B2
(45) Date of Patent: Nov. 10, 2015

(54) IMAGE READING DEVICE, IMAGE FORMING APPARATUS, AND NON-TRANSITORY COMPUTER READABLE MEDIUM STORING IMAGE READING PROGRAM

(71) Applicant: FUJI XEROX CO., LTD., Tokyo (JP)

(72) Inventor: Kazunori Sato, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/458,966

(22) Filed: Aug. 13, 2014

(65) Prior Publication Data

US 2015/0281493 A1    Oct. 1, 2015

(30) Foreign Application Priority Data

Mar. 27, 2014  (JP) .................. 2014-065949

(51) Int. Cl.
    *H04N 1/40*   (2006.01)
    *H04N 1/00*   (2006.01)
    *H04N 1/04*   (2006.01)

(52) U.S. Cl.
    CPC ......... *H04N 1/00806* (2013.01); *H04N 1/0446* (2013.01)

(58) Field of Classification Search
    CPC ..... H04N 9/3155; H04N 9/73; H04N 9/3197; H04N 1/6033; H04N 9/3182; H04N 1/6055; H04N 1/6058; H04N 1/6086; H04N 1/6027; H04N 1/484; H04N 13/0422; G06K 9/00234; G06K 9/4652

USPC .......... 358/1.9, 509, 474, 475, 504, 515, 518, 358/500, 400, 406; 348/223.1; 382/162–167

See application file for complete search history.

(56) References Cited

U.S. PATENT DOCUMENTS

| 5,802,214 A * | 9/1998 | Eschbach et al. ............. 382/254 |
| 5,920,407 A * | 7/1999 | Erickson et al. ............. 358/504 |
| 2003/0147110 A1* | 8/2003 | Barton et al. ................. 358/509 |
| 2007/0165288 A1 | 7/2007 | Ikeno et al. |

FOREIGN PATENT DOCUMENTS

| JP | A-2000-324309 | 11/2000 |
| JP | A-2007-194817 | 8/2007 |

* cited by examiner

*Primary Examiner* — Thomas D Lee
*Assistant Examiner* — Stephen M Brinich
(74) *Attorney, Agent, or Firm* — Oliff PLC (57) ABSTRACT

Provided is an image reading device including a light source that includes a unit irradiating an image with light beams of plural colors and adjusting light intensities of the respective light beams of the plural colors, a reading unit that reads the image irradiated with the light beams of the plural colors from the light source, and outputs image information, and an adjustment unit that adjusts, for a case where an image is read in color, the light intensities of the respective light beams of the plural colors so that values of pieces of image information corresponding to the respective colors fall within a range, and adjusts, for a case where an image is read in black and white, the light intensities of the respective light beams of the plural colors so that values of pieces of image information output from the reading unit fall within a range.

20 Claims, 8 Drawing Sheets

IMAGE READING DEVICE, IMAGE FORMING APPARATUS, AND NON-TRANSITORY COMPUTER READABLE MEDIUM STORING IMAGE READING PROGRAM

CROSS-REFERENCE TO RELATED APPLICATIONS

This application is based on and claims priority under 35 USC 119 from Japanese Patent Application No. 2014-065949 filed Mar. 27, 2014.

BACKGROUND

Technical Field

The present invention relates to an image reading device, an image forming apparatus, and a non-transitory computer readable medium storing an image reading program.

SUMMARY

According to an aspect of the invention, there is provided an image reading device including:

a light source that includes a unit irradiating an image with light beams of plural colors determined in advance and adjusting light intensities of the respective light beams of the plural colors;

a reading unit that reads the image irradiated with the light beams of the plural colors from the light source, and outputs the image as image information; and an adjustment unit that adjusts, for a case where an image is read in color, the light intensities of the respective light beams of the plural colors so that values of pieces of image information corresponding to the respective colors, which are output from the reading unit, fall within a range determined in advance, and adjusts, for a case where an image is read in black and white, the light intensities of the respective light beams of the plural colors so that values of pieces of image information output from the reading unit fall within a range determined in advance, based on the light intensities of the respective light beams of the plural colors which are adjusted when the image is read in color.

BRIEF DESCRIPTION OF THE DRAWINGS

Exemplary embodiments of the present invention will be described in detail based on the following figures, wherein.

(a) to (c) of FIG. 6 are diagrams illustrating the acquisition of an image read value according to an exemplary embodiment.

DETAILED DESCRIPTION

Hereinafter, exemplary embodiments of the invention will be described in detail with reference to the accompanying drawings.

Figure 1:
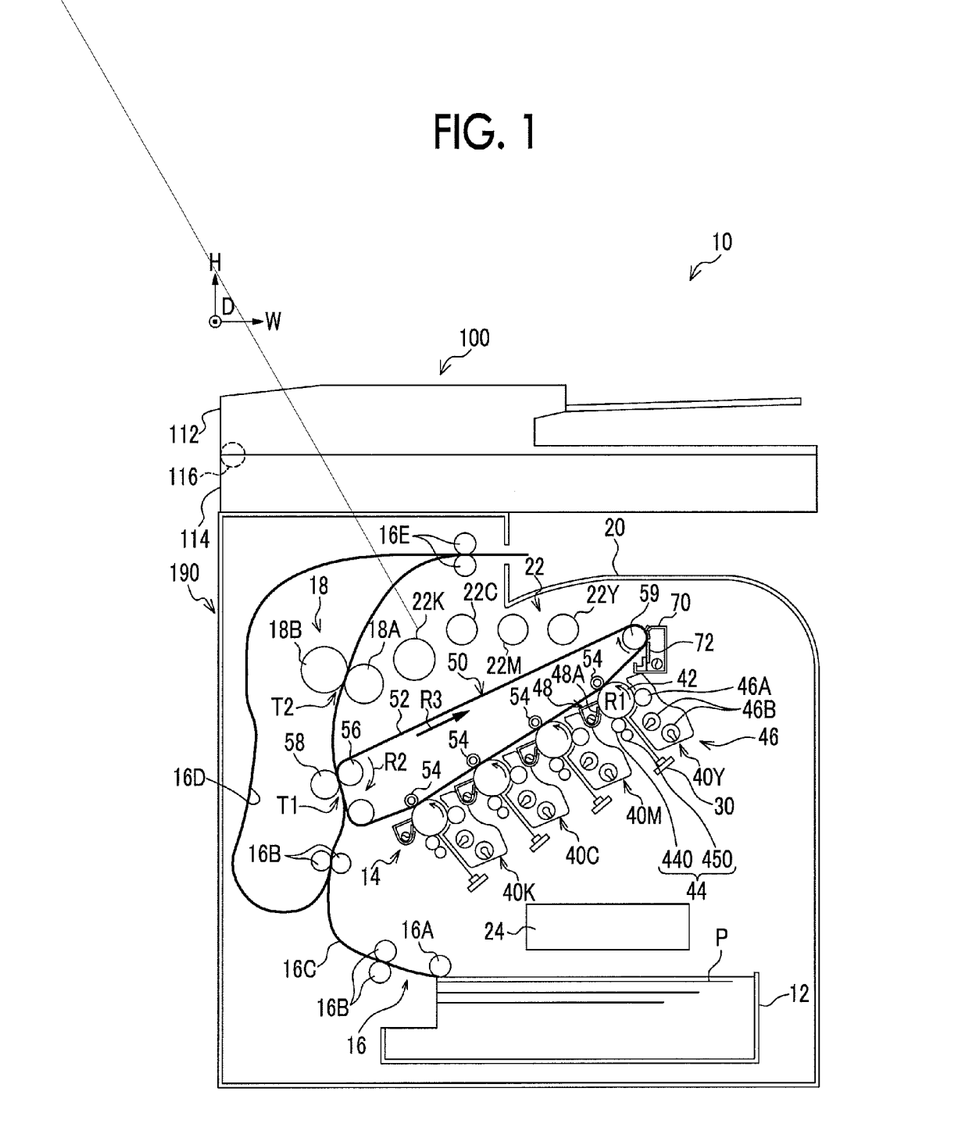
FIG. 1 is a schematic configuration diagram showing an example of a configuration of an image forming apparatus according to an exemplary embodiment.

FIG. 1 is a diagram of an example of a configuration of an image forming apparatus 10 according to this exemplary embodiment. As shown in FIG. 1, the image forming apparatus 10 includes an image reading section 100 as an image reading device, and an image forming section 190. The image reading section 100 is a part that reads an image of a document and outputs the image as image data, and the image forming section 190 is a part that forms an image on a recording medium based on the image data.

The image reading section 100 according to this exemplary embodiment includes a document conveyance section 112 and a document reading section 114. Meanwhile, the document conveyance section 112 and the document reading section 114 are connected to each other by a connection section 116, and the document conveyance section 112 is configured to be openable and closable over the document reading section 114 centering around the connection section 116.

Figure 2:
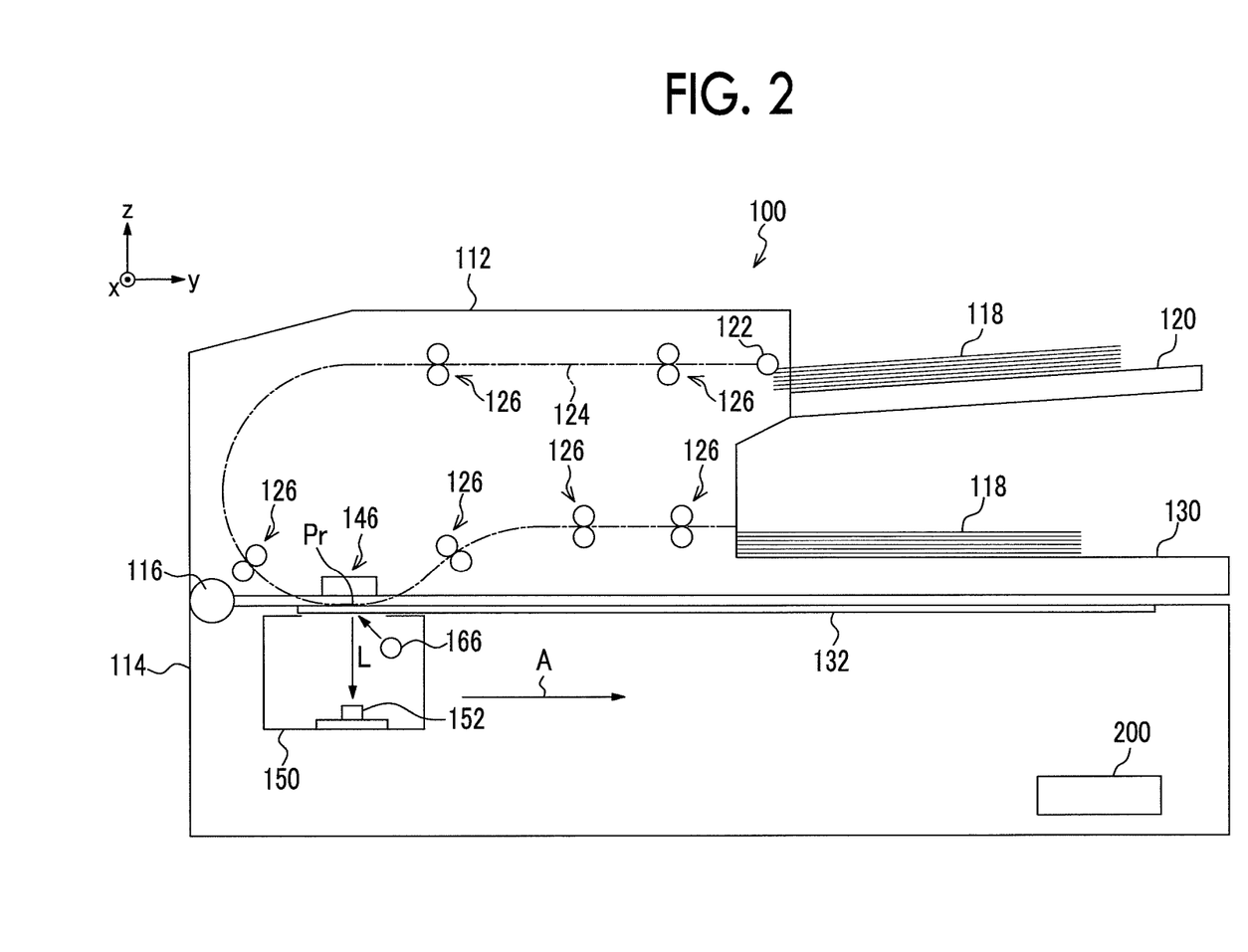
FIG. 2 is a schematic configuration diagram showing an example of a configuration of an image reading section according to an exemplary embodiment.

The image reading section 100 will be described in more detail with reference to FIG. 2. The document conveyance section 112 includes a document table 120 on which a document 118 having an image recorded thereon is placed, and the documents 118 placed on the document table 120 are ejected one by one by an ejection roller 122, and are then sent to a conveyance path 124.

The document 118 sent to the conveyance path 124 is conveyed up to a reading position Pr of the document reading section 114 by conveyance roller pairs 126, and the surface of the document is read by the document reading section 114. The document 118 is discharged to a paper discharging section 130.

On the other hand, the document reading section 114 includes a transparent platen glass 132 in which the document 118 is placed on the top face thereof. The reading position Pr is located at the top face of the platen glass 132. In addition, a lower portion of the platen glass 132 is provided with an image reading sensor 150 that optically reads an image of the document 118 and converts the image into an electrical signal. The image reading sensor is configured to be movable in the direction of an arrow A by a driving mechanism, not shown in the drawing, in order to read the document 118 disposed on the platen glass 132.

As an example, a contact image sensor (CIS) reading an image in proximity to the document 118 is adopted as the image reading sensor 150 according to this exemplary embodiment. Details of the image reading sensor 150 will be described later.

The image reading section 100 of this exemplary embodiment includes a reference plate 146 at a position corresponding to the reading position Pr of the document conveyance section 112. Irradiation light emitted from a light source 166 is reflected by the reference plate 146, and the light intensity of the reflected light is detected by a light detection element 152. As an example, the reference plate 146 according to this exemplary embodiment is configured as a white color reference plate.

The image reading section 100 further includes an image reading control section 200, but details of the image reading control section 200 will be described later.

Subsequently, the image forming section 190 according to this exemplary embodiment will be described in more detail with reference to FIG. 1 again. Meanwhile, in the following description, a direction indicated by an arrow H in FIG. 1 is set to a device height direction, and a direction indicated by an arrow W is set to a device width direction. In addition, a direction (appropriately indicated by an arrow D) which is perpendicular to the device height direction and the device width direction is set to a device depth direction.

The image forming section 190 forming an image on a recording paper P as a recording medium includes a recording paper accommodating section 12 that accommodates the recording paper P, a toner image forming section 14, a conveyance section 16, a fixing device 18, a discharging section 20, supply mechanisms 22, and a control section 24.

The control section 24 is a part that controls operations of the sections of the image forming apparatus 10, which will be described later in detail.

The toner image forming section 14 includes image forming units 40Y, 40M, 40C, and 40K and a transfer unit 50. Here, yellow (Y), magenta (M), cyan (C), and black (K) are examples of toner colors.

In addition, the image forming units 40Y, 40M, 40C, and 40K have the same configuration except for the toners used. Consequently, in FIG. 1, reference numerals of the sections constituting the image forming units 40M, 40C, and 40K are omitted.

The image forming unit 40Y includes an image holding member 42Y, a charging device 44Y, an exposing device 30Y, a developing device 46Y, and a removing device 48Y. Similarly, the image forming units 40M, 40C, and 40K include image holding members 42M, 42C, and 42K, charging devices 44M, 44C, and 44K, exposing devices 30M, 30C, and 30K, developing devices 46M, 46C, and 46K, and removing devices 48M, 48C, and 48K so as to correspond to the respective colors, respectively. In the following description, when the image forming units 40Y, 40M, 40C, and 40K and members constituting the image forming units are not required to be distinguished from each other for each toner color (Y, M, C, K), additional characters of Y, M, C, and K are omitted.

In each of the image forming units 40Y, 40M, 40C, and 40K, a toner image of each color of yellow (Y), magenta (M), cyan (C), and black (K) is formed on an outer circumferential surface of each of the image holding members 42Y, 42M, 42C, and 42K. In addition, the image forming units 40Y, 40M, 40C, and 40K are disposed as a whole in a state where the image forming units 40 are lined up to be inclined in the device width direction (see FIG. 1).

An image holding member 42 has a function of holding a toner image developed by a developing device 46. The image holding member 42 is cylindrically formed and rotates around its own axis (direction of an arrow R1 (see FIG. 1)) by the driving unit (not shown). As an example, the image holding member 42 includes an aluminum substrate, and a photosensitive layer (not shown) in which an undercoat layer, a charge generation layer, and a charge transport layer are formed on the substrate in this order.

A charging device 44 has a function of charging the outer circumferential surface of the image holding member 42. The charging device 44 is disposed along the direction of the own axis (device depth direction) of the image holding member 42. The charging device 44 includes a charging roll 440 and a cleaning roll 450. A voltage required to charge the outer circumferential surface of the image holding member 42 is applied to the axis (not shown) of the charging roll 440. The cleaning roll 450 removes impurities such as toner, an external additive, paper powder, and dust which become attached to the outer circumferential surface of the charging roll 440.

An exposing device 30 has a function of forming a latent image on the outer circumferential surface of the image holding member 42 which is charged by the charging device 44. The exposing device 30 emits exposure light from, for example, a light-emitting diode array (not shown) in response to image data received from an image signal processing section (not shown) which constitutes the control section 24. The outer circumferential surface of the image holding member 42 which is charged by the charging device 44 is irradiated with the exposure light, and a latent image is formed on the outer circumferential surface.

The developing device 46 has a function of developing the latent image formed on the image holding member 42 as a toner image. The developing device 46 is disposed along the axial direction of the image holding member 42. The developing device 46 includes a toner supply body 46A supplying a toner to the outer circumferential surface of the image holding member 42, and plural conveyance members 46B conveying a developer including a toner and a carrier to the toner supply body 46A.

A removing device 48 has a function of, after the toner image formed on the outer circumferential surface of the image holding member 42 is primarily transferred to a transfer belt 52, removing the toner, the external additive, and the like remaining on the outer circumferential surface of the image holding member 42 without being primarily transferred. The removing device 48 is disposed along the axial direction of the image holding member 42, and includes a blade 48A coming into contact with the outer circumferential surface of the image holding member 42.

The transfer unit 50 has a function of, after the toner image of each color which is developed on the outer circumferential surface of each image holding member 42 by each developing device 46 is primarily transferred, secondarily transferring the toner image to the recording paper P. The transfer unit 50 includes the transfer belt 52, primary transfer rolls 54 of the respective colors, a driving roll 56, and a secondary transfer roll 58.

The transfer belt 52 is configured as an endless belt. The primary transfer rolls 54 and the driving roll 56 are disposed so as to come into contact with the inner circumferential surface of the transfer belt 52. The posture of the transfer belt 52 is determined by four primary transfer rolls 54, the driving roll 56, a tension applying roller 59, and the like which come into contact with the inner circumferential surface of the transfer belt 52. The transfer belt is inclined in the device width direction when viewed from the front side. The outer circumferential surfaces of the image holding members 42 constituting the respective image forming units 40 which are lined up to be inclined in the device width direction come into contact with the outer circumferential surface of the transfer unit 50 facing the lower side in the device height direction. Meanwhile, the transfer belt 52 is given tension by the tension applying roller 59 which is pressed by a pressing unit (not shown).

The driving roll 56 is configured as a long roll. A portion of the outer circumferential surface of the driving roll 56 is wound with the inner circumferential surface of the transfer belt 52. When the driving roll 56 rotates (rotates in the direction of an arrow R2) around its own axis by a driving source (not shown), the driving roll 56 gives a frictional force to a part of the transfer belt 52 which is wound around the outer circumferential surface of the driving roll 56. The driving roll 56 rotates the transfer belt 52 in the direction of an arrow R3. The driving roll 56 has a function of rotating the transfer belt 52 as described above, and a function as a back-up roll of the secondary transfer roll 58 that secondarily transfers the toner image, which is primarily transferred to the outer circumferential surface of the transfer belt 52, to the recording paper P as will be described later.

Each of the primary transfer rolls 54 is disposed in a state where the primary transfer roll is offset to the downstream side in the rotation direction (direction of the arrow R3) of the transfer belt 52, with respect to a virtual straight line along the device height direction which passes through the center of the axis of each image holding member 42, with the transfer belt 52 interposed therebetween. For this reason, the transfer belt 52 rotates in a state where the transfer belt is wound around the outer circumferential surfaces of the image holding members 42.

The primary transfer roll 54 primarily transfers the toner image formed on the outer circumferential surface of each of the image holding members 42Y, 42M, 42C, and 42K to the outer circumferential surface of the transfer belt 52 by a primary transfer voltage being applied. Meanwhile, the primary transfer voltage refers to a voltage which is applied to the primary transfer roll 54 during the primary transfer. For example, the primary transfer voltage is determined by the control section 24 based on values detected by a temperature sensor (not shown), a humidity sensor (not shown), and the like which are disposed within the image forming section 190.

The secondary transfer roll 58 is configured as a long roll. The secondary transfer roll 58 is pressed by a pressing unit (not shown) during an image forming operation, and forms a nip section (secondary transfer position T1) with the transfer belt 52. The secondary transfer roll 58 secondarily transfers the toner image, which is primarily transferred to the outer circumferential surface of the transfer belt 52, to the recording paper P which is conveyed along a conveyance path 16C to be described later and passes through the secondary transfer position T1, by a secondary transfer voltage being applied. Meanwhile, the secondary transfer voltage refers to a voltage which is applied to the secondary transfer roll 58 during the secondary transfer, and is determined by the control section 24 in the same manner as the case of the primary transfer voltage.

A cleaning device 70 has a function of, after the toner image primarily transferred to the outer circumferential surface of the transfer belt 52 is secondarily transferred to the recording paper P, removing toner, an external additive, and the like, which remain on the outer circumferential surface of the transfer belt 52 without being secondarily transferred, from the outer circumferential surface of the transfer belt 52 by a scraping section 72. The cleaning device 70 is disposed along the axial direction of the tension applying roller 59 with the transfer belt 52 interposed therebetween.

Supply mechanisms 22Y, 22M, 22C, and 22K have a function of supplying a developer to the developing devices 46Y, 46M, 46C, and 46K.

The conveyance section 16 has a function of conveying the recording paper P accommodated in the recording paper accommodating section 12 to the discharging section 20 to be described later. The conveyance section 16 includes a delivery roll 16A, plural conveyance roller pairs 16B, an inversion conveyance section 16D, and discharging rolls 16E to be described later. The delivery roll 16A sends the recording paper P accommodated in the recording paper accommodating section 12 to the downstream side in the conveyance direction of the recording paper P with respect to the delivery roll 16A. The plural conveyance roller pairs 16B are disposed along the conveyance path 16C through which the recording paper P is sent by the delivery roll 16A is conveyed. The plural conveyance roller pairs 16B convey the recording paper P sent by the delivery roll 16A to the secondary transfer position T1 at which the driving roll 56 and the secondary transfer roll 58 face each other.

In addition, the conveyance section 16 is provided with the inversion conveyance section 16D that inverts the front and back of the recording paper P and conveys the recording paper P so as to be capable of forming an image on both faces of the recording paper P. The inversion conveyance section 16D is provided on the opposite side to the transfer unit 50 with the conveyance path 16C interposed therebetween when the image forming apparatus 10 is viewed from the front side. The inversion conveyance section 16D switches back the recording paper P having a toner image being fixed onto the front face thereof. Thereafter, the inversion conveyance section 16D conveys the recording paper P to the secondary transfer position T1 so that the back face of the recording paper P faces the outer circumferential surface of the transfer belt 52.

The fixing device 18 has a function of fixing the toner image, which is secondarily transferred to the recording paper P, to the recording paper P. The fixing device 18 includes a fixing roll 18A and a pressurization roll 18B. The fixing device 18 is disposed on the downstream side in the conveyance direction of the recording paper P with respect to the secondary transfer position T1. The fixing roll 18A is disposed on the side of the recording paper P to which the toner image is transferred, and has a heating unit such as, for example, a halogen heater (not shown) disposed on the inner circumferential surface side thereof. The pressurization roll 18B pressurizes the recording paper P, which is conveyed through the conveyance path 16C and passes through a position T2 (see FIG. 1) which faces the fixing roll 18A, toward the fixing roll 18A.

The discharging section 20 is formed in a portion on an outer upper surface of the body of the image forming section 190 on the downstream side in the conveyance direction of the recording paper P with respect to the fixing device 18. The recording paper P having the toner image fixed thereto is discharged to the discharging section 20 by the discharging rolls 16E provided in a region of the conveyance path 16C between the fixing device 18 and the discharging section 20.

Subsequently, an image forming operation in the image forming section 190 will be described with reference to FIG. 1.

When an image signal is transmitted to the control section 24 from an external device (not shown) such as, for example, a personal computer, the control section operates the image forming apparatus 10. The control section 24 converts the image signal into image data (image information) of each color of yellow (Y), magenta (M), cyan (C), and black (K). The pieces of image data of the respective colors are output to the exposing device 30.

Subsequently, exposure light emitted from the exposing device 30 in response to the pieces of image data of the respective colors is incident on the outer circumferential surface of the image holding member 42 which is charged by the charging device 44. A latent image corresponding to the image data of each color is formed on the outer circumferential surface of each image holding member 42.

Further, the latent image formed on the outer circumferential surface of each image holding member 42 is developed as a toner image of each color by the developing device 46.

The toner image of each color of the outer circumferential surface of the image holding member 42 is primarily transferred to the outer circumferential surface of the transfer belt 52 by the primary transfer roll 54 that the image holding member 42 faces.

On the other hand, the recording paper P is sent from the recording paper accommodating section 12 in accordance with a timing when a part of the outer circumferential surface of the transfer belt 52 having the toner image being primarily transferred thereto reaches the secondary transfer position T1 by rotation, and is then conveyed to the secondary transfer position T1. The toner image, which is primarily transferred to the outer circumferential surface of the transfer belt 52, is secondarily transferred to the recording paper P which is conveyed to and passes through the secondary transfer position T1.

Subsequently, the recording paper P having the toner image being transferred thereto is conveyed toward the fixing device 18. The toner image is heated and pressurized by the fixing roll 18A and the pressurization roll 18B which constitute the fixing device 18, and is then fixed onto the recording paper P.

The recording paper P having the toner image being fixed thereto is discharged to the discharging section 20, and thus the image forming operation is terminated.

Meanwhile, when an image is formed on both faces of the recording paper P, a toner image is fixed onto the front face of the recording paper P by the fixing device 18 and is then conveyed to the inversion conveyance section 16D. The recording paper P having the toner image being fixed onto the front face thereof is switched back by the inversion conveyance section 16D. Thereafter, the toner image is secondarily transferred to the back face of the recording paper P at the secondary transfer position T1. Further, the toner image which is secondarily transferred is fixed by the fixing device 18. Finally, the recording paper P having the toner image being fixed onto both faces thereof is discharged to the discharging section 20.

Subsequently, an example of the configuration of the image reading sensor 150 according to this exemplary embodiment will be described with reference to FIG. 3. Since a description will be given of a positional relationship in a case where an image of the document 118 is read, the document 118 is also shown in FIG. 3.

Figure 3:
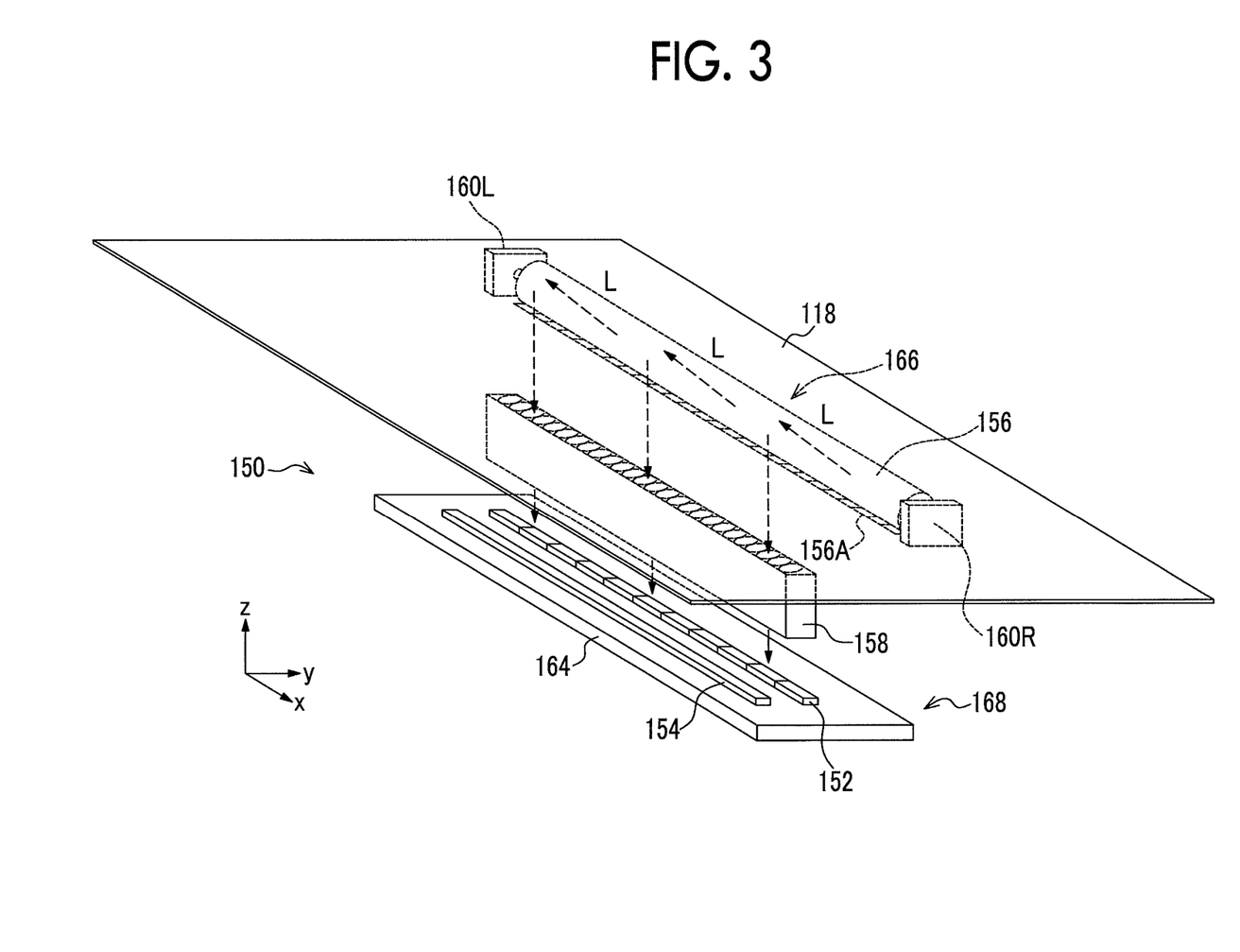
FIG. 3 is a schematic configuration diagram showing an example of a configuration of an image reading sensor according to an exemplary embodiment.

As shown in FIG. 3, the image reading sensor 150 is configured to include a light detection section 168, the light source 166, and a lens 158. As described above, the image reading sensor 150 according to this exemplary embodiment is configured as a CIS.

The light detection section 168 is configured to include the light detection element 152 and a light detection element driving circuit 154 which are provided on a substrate 164.

As an example, the light detection element 152 is constituted by charge coupled device (CCD) line sensors which are arrayed in a scanning direction (x direction shown in FIG. 3), and reads an image of the document 118 for each line. The number of columns of the light detection element 152 which are arrayed in the scanning direction is not particularly limited, but is set to one in this exemplary embodiment.

The light detection element driving circuit 154 is a circuit that controls a reading timing of the light detection element 152, and the like.

The light source 166 is configured to include light emitting diodes (LED) 160R and 160L and a light guide 156. Each of the LEDs 160R and 160L (hereinafter, may be collectively referred to as "LED 160") is configured to emit light by switching between three colors of red (R), green (G), and blue (B). As the LED 160, a device in which LED elements emitting light in the respective colors R, G, and B are sealed in one package may be used, or three devices in which LED elements emitting light in the respective colors R, G, and B are individually sealed in packages may be used. The LED 160 is current-driven by an LED driving circuit 162 (see FIG. 5) to emit light.

The light guide 156 is a light guiding body that guides light beams L of the respective colors R, G, and B irradiated from the LEDs 160R and 160L to the document 118 disposed on the platen glass 132 (see FIG. 2, and omitted in FIG. 3), and is formed in an elongated shape having a length corresponding to the width of the document 118. The light guide 156 according to this exemplary embodiment is formed to have a columnar shape using a transparent plastic such as an acrylic resin or polycarbonate. Two end faces of the column serve as incident surfaces of the light beams emitted from the respective LEDs 160R and 160L. In addition, the light guide 156 includes a reflection surface 156A that reflects the light beam from the LED 160 which is incident from the incident surface in the direction of the platen glass 132 and guides the light beam.

The lens 158 is an imaging element in which plural erecting equal magnification imaging type lenses are arrayed in the scanning direction (x direction), and guides the reflected light beams of the light beams L of the light source 166 from the document 118 to the light detection element 152. In this exemplary embodiment, a SELFOC (registered trademark) lens array (SLA) is used as an example of the lens 158.

Subsequently, an example of a configuration of main electrical components of the image forming apparatus 10 will be described with reference to FIG. 4.

Figure 4:
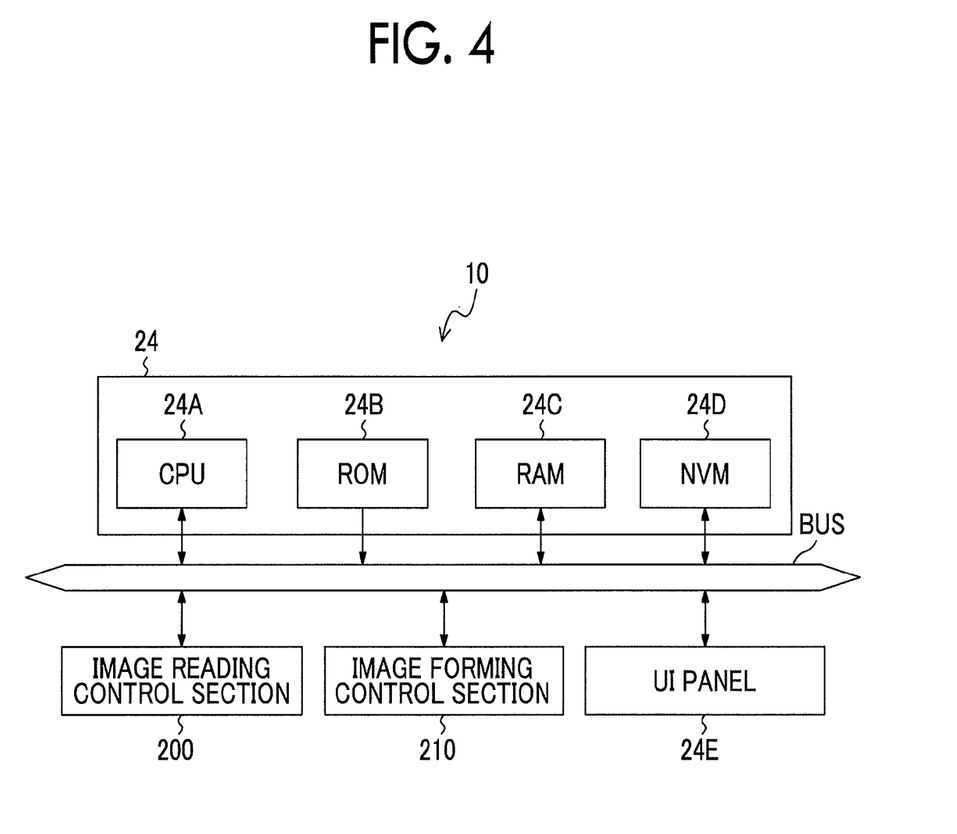
FIG. 4 is a block diagram showing an example of a configuration of main electrical components of an image forming apparatus according to an exemplary embodiment.

The control section 24 of the image forming apparatus 10 described above includes a central processing unit (CPU) 24A, a read only memory (ROM) 24B, a random access memory (RAM) 24C, and a non volatile memory (NVM) 24D as shown in FIG. 4. These are connected to each other through a bus BUS such as an address bus, a data bus, and a control bus.

The CPU 24A collectively controls the entirety of the image forming apparatus 10 (the image reading section 100 and the image forming section 190) by various control programs, a light intensity adjustment process program to be described later, or the like.

The ROM 24B stores various programs such as a program for controlling the entirety of the image forming apparatus 10, the light intensity adjustment process program to be described later, and the like. The CPU 32A reads the programs from the ROM 32B, loads the programs into the RAM 32C, and executes the programs, and thus various controls are performed.

The NVM 24D is a non-volatile storage medium storing various pieces of information that have to be held even when a power switch of the device is turned off.

Further, the image reading control section 200, an image forming control section 210, and a user interface (UI) panel 24E are connected to the bus BUS.

The image reading control section 200 has a function of controlling the image reading sensor 150 and the signal processing section 170 such that they read an image of the document 118 and output the image in a signal format which is determined in advance. For example, the image reading control section 200 may be configured to include a CPU, a ROM, a RAM, and the like which are not shown in the drawing. Details of the image reading control section 200 will be described later.

The image forming control section 210 is a part that controls the components of the image forming section 190 based on an image signal transmitted from an external device or image data and the like output from the signal processing section 170 to thereby form an image on the recording paper P. For example, the image forming control section 210 may be configured to include a CPU, a ROM, a RAM, and the like which are not shown in the drawing.

As an example, the UI panel 24E is constituted by a touch panel display in which a transmissive touch panel is superposed on a display, or the like. Various pieces of information are displayed on a display surface of the display, and information and commands are received by a user touching the touch panel. Meanwhile, in this exemplary embodiment, a description is given by illustrating a configuration example in which the UI panel 24E is applied. However, the invention is not limited thereto, and a configuration may be adopted in which a display unit, such as a liquid crystal display, and an operation unit provided with a numerical keypad, operation buttons, and the like are separately provided.

Subsequently, an image reading operation controlled by the image reading control section 200 will be described with reference to FIG. 5.

The image reading control section 200 controls turn-on and turn-off of a current flowing to the LED elements of the respective colors R, G, and B of the LED 160 through the LED driving circuit 162, and sequentially lights the LED elements of the respective colors R, G, and B of the LED 160. In addition, the image reading control section 200 controls an amplitude (driving current value) of a current flowing to the LED elements of the respective colors R, G, and B of the LED 160.

The image reading control section 200 controls the light source 166 such that it irradiates the document 118 with light beams of the respective colors R, G, and B, and controls the light detection element 152 such that it captures a read signal for one line of the document 118 for each irradiation through the light detection element driving circuit 154. In other words, the light detection section 168 transmits read signals of the respective colors R, G, and B for one line of the image of the document 118 whenever light beams of the respective colors R, G, and B are emitted from the light source 166, to the signal processing section 170.

The signal processing section 170 is configured to include a sample hold circuit 172, an amplification circuit 174, an A/D conversion circuit 176, an RGB rearrangement circuit 178, and a shading correction circuit 180.

The sample hold circuit 172 is a circuit, performing sampling and holding, which samples analog read signals of the respective colors R, G, and B transmitted from the light detection section 168 and holds the signals for a certain period of time.

The amplification circuit 174 amplifies the read signals of the respective colors R, G, and B which are sampled and held by the sample hold circuit 172. The amplification circuit 174 may be an amplification circuit of a fixed gain, or may be an amplification circuit of a variable gain. A gain in a case of the amplification circuit of the variable gain may be controlled by the image reading control section 200.

The A/D conversion circuit 176 performs analog/digital (A/D) conversion of the read signals of the respective colors R, G, and B which are amplified by the amplification circuit 174, and generates pieces of image data (hereinafter, may be referred to as "RGB image data") of the read signals of the respective colors R, G, and B which are pieces of digital data.

The RGB rearrangement circuit 178 converts the RGB image data, which are serially transmitted, into parallel RGB image data.

The shading correction circuit 180 corrects the RGB image data converted into the digital signal by the A/D conversion circuit 176 so that a white level of a read image conforms with a white level in the image formation by the image forming section 190.

Figure 5:
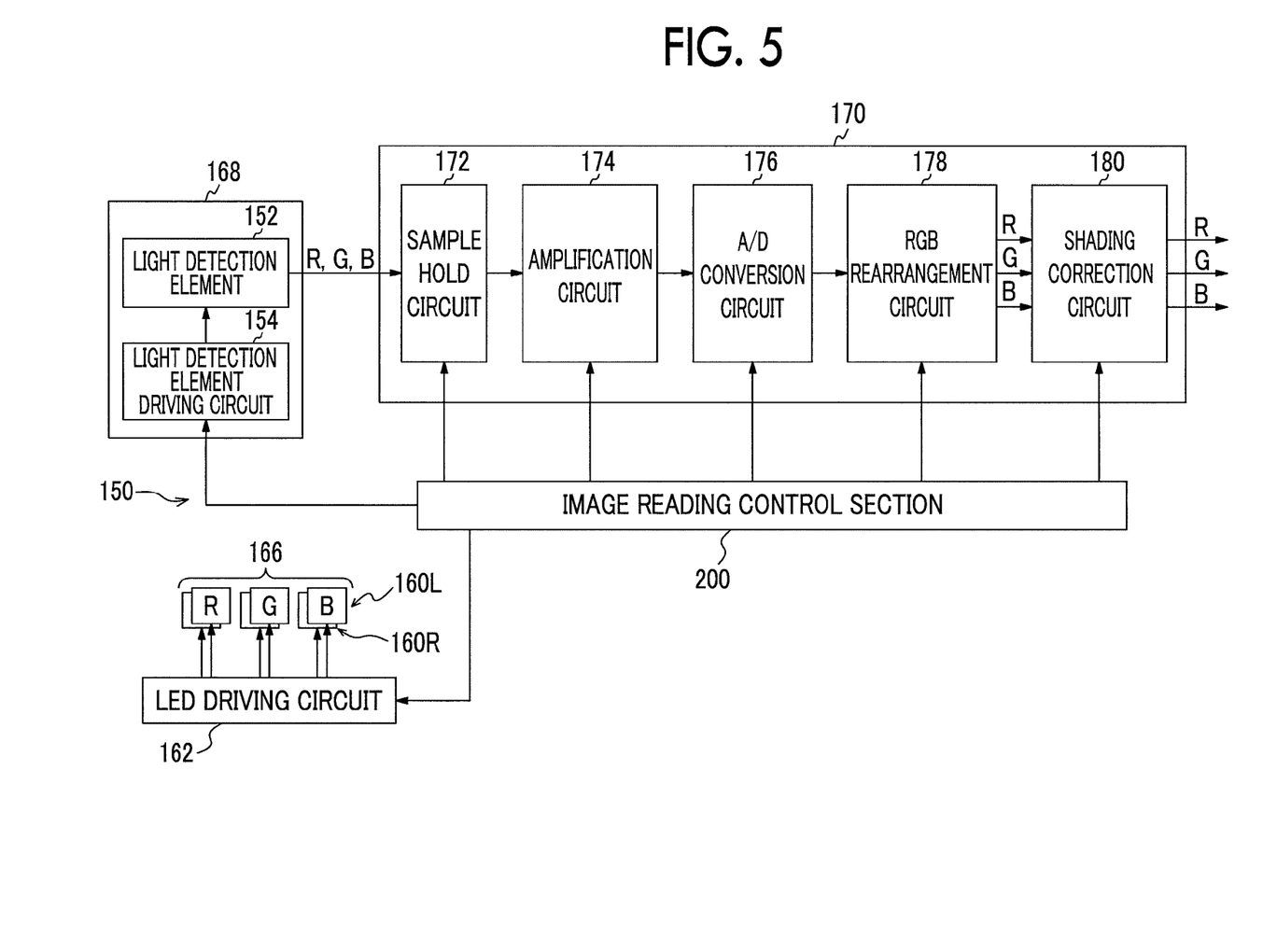
FIG. 5 is a block diagram showing an example of a configuration of an image reading control section according to an exemplary embodiment.

Meanwhile, the circuit partitioning of the light detection section 168, the signal processing section 170, and the like shown in FIG. 5 is merely an example, and is not limited thereto. For example, the components from the light detection section 168 to the A/D conversion circuit 176 may be configured as an analog front end (AFE) as one module.

Incidentally, the A/D conversion circuit 176 outputs RGB image data as a digital signal having the number of bits which is determined in advance. However, in this case, the range of the magnitudes of the read signals of the respective colors R, G, and B which are input to the A/D conversion circuit 176 (hereinafter, maybe referred to as "input dynamic range") is adjusted so as to fall within the gradation of the number of bits which is determined in advance. The input dynamic range fluctuates due to variations in the luminance of the light source 166, variations in the detection sensitivity of the light detection element 152, or the like. Meanwhile, the number of bits of the digital output of the A/D conversion circuit 176 is not particularly limited, but is set to 10 bits as an example in this exemplary embodiment.

In the image reading section 100 according to this exemplary embodiment, a method of adjusting light intensity from the light source 166 with which each line of the document 118 is irradiated is adopted as a method of adjusting the input dynamic range. The adjustment of the light intensity with which irradiation is performed from the light source 166 is performed by changing a duty (pulse time width) of a current waveform flowing to the LED 160 from the LED driving circuit 162 and controlling a lighting time (irradiation time). Hereinafter, such a process of adjusting light intensity may be referred to as a "light intensity adjustment process". The light intensity adjustment process is a process of automatically controlling the magnitude of a signal input to the A/D conversion circuit 176, and may be referred to as a type of so-called automatic gain control (AGC).

In addition, the light intensity adjustment process is performed by reading the reference plate 146 of a color determined in advance for each of colors R, G, and B by the light detection section 168, comparing the read values thereof with a reference value which is determined in advance, and adjusting the read values so as to fall within the reference value range. Meanwhile, as described above, in the image reading section 100 according to this exemplary embodiment, a white color is used as the color of the reference plate 146. In this case, for example, the reference plate 146 is configured by attaching a white film to a position, which is determined in advance, within the image reading section 100.

In the above-described light intensity adjustment process, when color reading is performed in which an image of the document 118 is read and RGB image data is generated, the process is converged by reading the reference plate 146 and repeating a computation by using lighting times (duties) a determined in advance as initial values with respect to the LED elements of the respective colors R, G, and B. The converged value at that time is referred to as $\beta$ herein.

On the other hand, when black-and-white reading is performed in which an image of the document 118 is read and image data having a single color is generated, there is also a method of converging the process by performing the light intensity adjustment process by using a which is the same initial value as that in a case of the color reading with respect to a lighting time of each color.

However, when this method is used, all of the LED elements of the respective colors R, G, and B of the LED 160R and the LED elements of the respective colors R, G, and B of the LED 160L are lit in a case of black-and-white reading, and accordingly, the brightness for each of R, G, and B is out of balance due to variations in the luminance of the LED elements of the respective colors R, G, and B. In this case, for example, the reading of a color image in black-and-white reading results in a difference in concentration depending on colors even in portions of the color image which have the same concentration, which leads to reproducibility deterioration of image density.

Consequently, in the invention, the light intensity adjustment process of black-and-white reading is executed by using lighting times of the respective colors R, G, and B of each of the LEDs 160R and 160L which are results of the light intensity adjustment process executed in color reading, in other words, by using the lighting times of the respective colors R, G, and B of color reading, which are β rather than a, as initial values. Thus, the levels (ratios) of the respective colors R, G, and B at the time of reading the reference plate 146 are already aligned. Accordingly, in black-and-white reading, even when the entire light intensity is adjusted by lighting all the LED elements of the respective colors R, G, and B of each of the LEDs 160R and 160L, concentration varying depending on colors even in portions of the color image which have the same concentration is suppressed, and reproducibility deterioration of image density is suppressed. In addition, a white color read in black-and-white reading also becomes a white color having a good balance of colors R, G, and B.

Hereinafter, a light intensity adjustment process according to this exemplary embodiment will be described, but a method of acquiring an image read value at the time of reading the reference plate 146 according to this exemplary embodiment will be described first with reference to (a) to (c) of FIG. 6.

Figure 6:
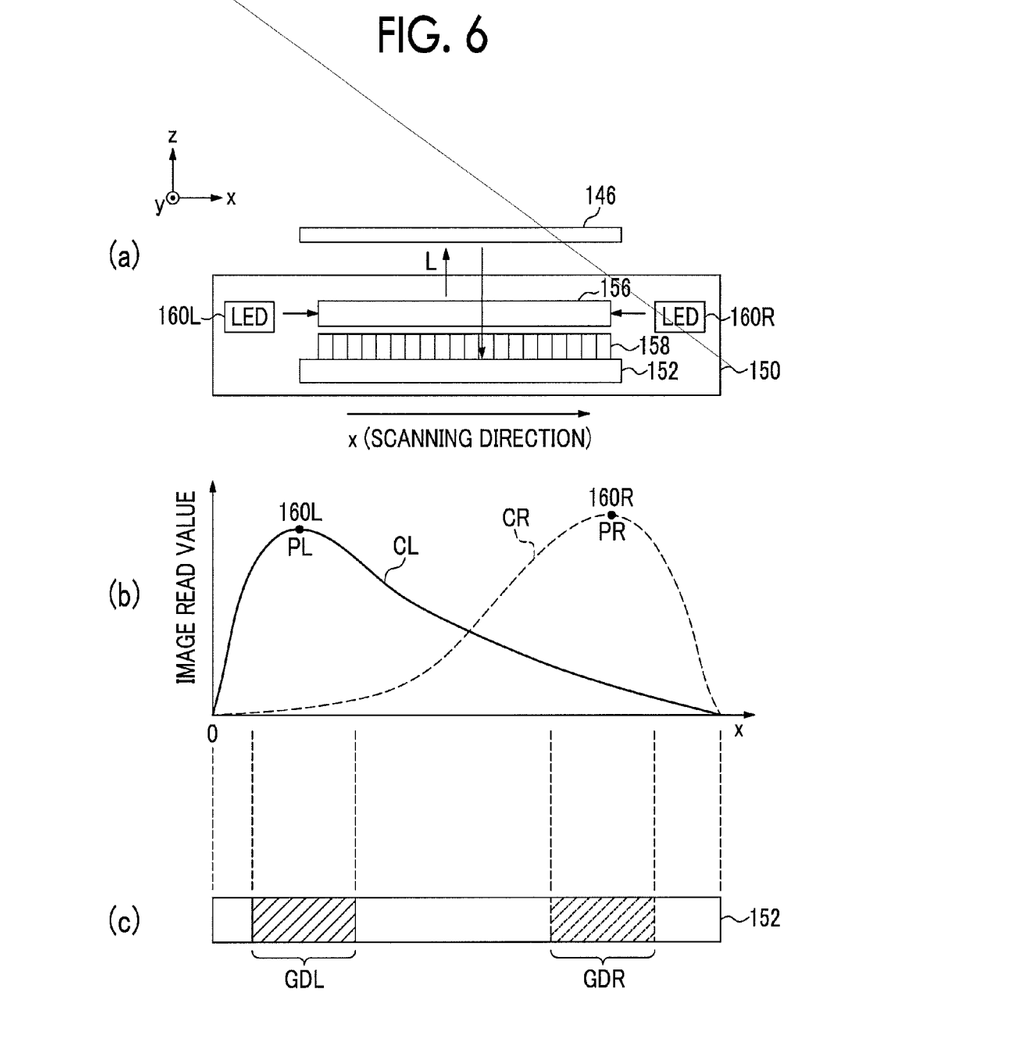

(a) of FIG. 6 is a diagram showing an arrangement relationship between the image reading sensor 150 and the reference plate 146 which are described above (see FIG. 2). As shown in (a) of FIG. 6, the reference plate 146 is configured in an elongated shape in the x direction in response to the arrangement length of the light detection element 152. A light beam L emitted from the LED 160 is reflected by the reference plate 146 and is then incident on the light detection element 152, and the reflected light intensity is acquired as an image read value.

Consequently, in this exemplary embodiment, the above-described image read value is acquired by individually lighting the LEDs 160R and 160L in order to correct a difference in the emission property between the right and left LEDs 160R and 160L. (b) of FIG. 6 shows a property CR in which reflected light from the reference plate 146 is read by lighting the LED 160R and a property CL in which reflected light from the reference plate 146 is read by lighting the LED 160L. Further, in this exemplary embodiment, the acquisition of the image read value through the individual lighting is performed for each of colors R, G, and B, and the image read value is compared with a reference value which is determined in advance for each of colors R, G, and B. In other words, the comparison between the image read value and the reference value is performed in six ways.

The range of the image read value to be compared with the reference value in the light detection element 152 is not particularly limited. However, in this exemplary embodiment, as shown in (c) of FIG. 6, an image read value of a certain region in a range including a peak value of the properties of the image read values of the LEDs 160R and 160L (regions denoted by GDR and GDL in (c) of FIG. 6, and may be referred to as "image read region" below) is used. At the time of the comparison, the comparison is performed using an average value of the image read values of the image read regions.

In other words, image read values of the image read region GDR including a peak value PR of the property CR are acquired with respect to the LED 160R, and the average value thereof is calculated and is then compared with a reference value. In addition, image read values of the image read region GDL including a peak value PL of the property CL are acquired with respect to the LED 160L, and the average value thereof is calculated and is then compared with a reference value. Naturally, the invention is not limited thereto, and for example, a configuration may be adopted in which the peak values PR and PL are detected and compared with the reference value. Meanwhile, hereinafter, when the image read regions GDR and GDL are not distinguished from each other, the image read regions may be collectively referred to as the image read region GD.

Figure 7:
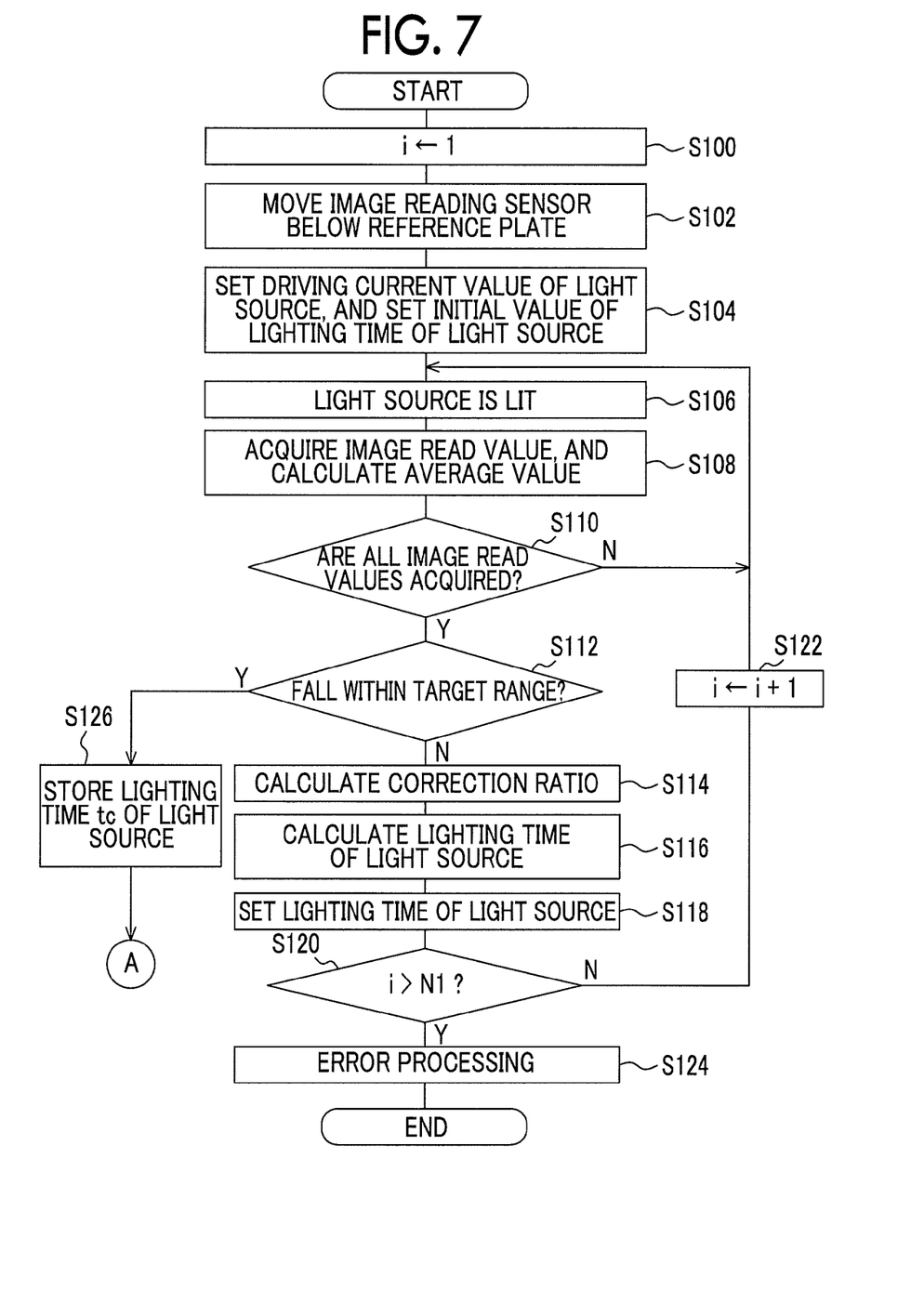
FIG. 7 is a partial flowchart showing a flow of processing of a light intensity adjustment process program according to an exemplary embodiment.
Figure 8:
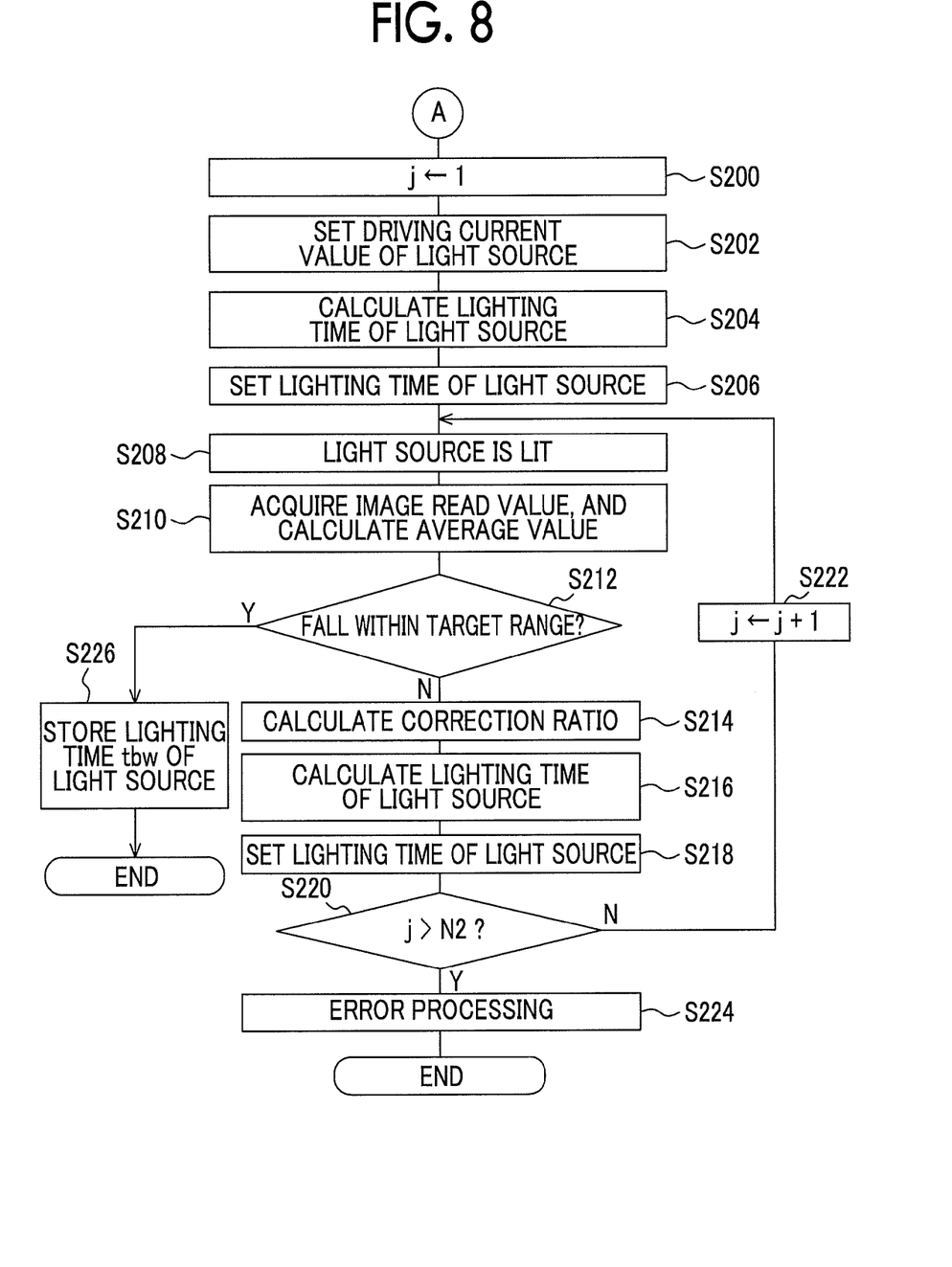
FIG. 8 is a partial flow chart showing a flow of processing of a light intensity adjustment process program according to an exemplary embodiment.

Subsequently, a light intensity adjustment process executed in the image reading section 100 according to this exemplary embodiment will be described with reference to FIGS. 7 and 8. FIGS. 7 and 8 are flow charts showing a flow of processing of a light intensity adjustment process program executed by the CPU 24A of the image forming apparatus 10. Meanwhile, in this exemplary embodiment, a description is given by illustrating a configuration in which this light intensity adjustment process program is executed by the CPU 24A of the image forming apparatus 10. However, the invention is not limited thereto, and a configuration may be adopted in which the program is executed by a CPU, not shown in the drawing, of the image reading section 100.

In the processing shown in FIGS. 7 and 8, as an example, when power is applied to the image forming apparatus 10, the CPU 24A reads the light intensity adjustment process program from a storage unit such as the ROM 24B and executes the program. Here, an execution timing of the light intensity adjustment process is not limited to when power is applied. For example, the process may be performed at a timing of correction such as shading correction which is executed by the image reading section 100. Meanwhile, FIG. 7 shows a light intensity adjustment process in a case of color reading (hereinafter, may be referred to as "color light intensity adjustment process"), and FIG. 8 shows a light intensity adjustment process in a case of black-and-white reading (hereinafter, may be referred to as "black-and-white light intensity adjustment process").

In this exemplary embodiment, a description is given by illustrating a configuration in which this light intensity adjustment process program is stored in advance in the ROM 24B and the like. However, the invention is not limited thereto, and a configuration in which this light intensity adjustment process program is provided in a state where the program is stored in a computer-readable portable storage medium, a configuration in which the program is distributed through a communication unit in a wired or wireless manner, and the like may be applied.

In this exemplary embodiment, this light intensity adjustment process is realized by a software configuration using a computer by executing a program, but is not limited thereto. For example, the process may be realized by a hardware configuration employing an application specific integrated circuit (ASIC) or by a combination of a hardware configuration and a software configuration.

Referring to FIG. 7, first, in step S100, a value of a counter i is set to 1 to reset the counter i. The counter is a counter for the number of circulations of a circulating process of changing a lighting time of the light source 166 by a correction ratio and lighting the light source 166 again in steps S114 to S122 which will be described later.

In the subsequent step S102, the image reading sensor 150 is moved below the reference plate 146 (see FIG. 2).

In the subsequent step S104, driving current values for the LED elements of the respective colors R, G, and B of the LED 160R and the LED elements of the respective colors R, G, and B of the LED 160L of the light source 166 and initial values of lighting times for the respective LED elements are set. In this exemplary embodiment, a uniform driving current value, which is determined in advance for the LED element of each color, is used as the driving current value. However, the invention is not limited thereto, and driving current values determined for the individual LED elements of the respective colors may be used. In addition, as the initial values of the lighting times, individual initial values are used for the LED elements of the respective colors.

The above-described driving current values and the initial values of the respective lighting times may be determined in advance by an experiment using a real machine of the image reading section 100, a simulation in which a real machine is modeled, or the like, may be stored in a storage unit such as the ROM 24B, and may be read out and set in step S104.

In the subsequent step S106, the light source 166 is lit. In the subsequent step S108, image read values of the image read region GD of the light detection element 152 are acquired, and an average value of the image read values (hereinafter, may be referred to as "average image read value Rc") is calculated.

As described above, the processes of step S106 and step S108 are executed by setting six driving current values and lighting times of the LED elements of the respective colors R, G, and B of the LED 160R and the LED elements of the respective colors R, G, and B of the LED 160L. In other words, six average image read values Rc are acquired. Meanwhile, the driving current values may be the same as each other in the respective colors.

In the subsequent step S110, it is determined whether all the six average image read values Rc have been acquired. When the determination is an affirmative determination, the process proceeds to step S112. On the other hand, when the determination is a negative determination, the process returns to step S106 to continue the lighting of the light source 166.

In the subsequent step S112, it is determined whether the average image read values Rc fall within a target range. That is, when an upper limit of the target range is set to Rcmax and a lower limit is set to Rcmin, it is determined whether the following Expression (1) is established.

$$Rcmin \le Rc \le Rcmax \qquad (1)$$

Here, Rcmin and Rcmax may be set in advance by an experiment using a real machine of the image reading section 100, or the like, and may be stored in a storage unit such as the ROM 24B. Meanwhile, in step S112, the determinations in a case where the above-described six driving current values and lighting times are set are collectively performed.

When the affirmative determination is made in step S112, the process proceeds to step S126 to store a lighting time tc to be described later, which is stored in a storage unit such as the RAM 24C at that point in time, as a lighting time tc for color reading in a storage unit such as the NVM 24D. Thereafter, the process moves to step S200 to proceed to a black-and-white light intensity adjustment process. On the other hand, when the negative determination is made in step S112, the process proceeds to step S114.

In step S114, a correction ratio ηc of a lighting time of the LED element which is determined not to fall within the target range in step S112 is calculated by the following Expression (2).

$$\eta c = Rct/Rc \qquad (2)$$

Here, Rct denotes a target value of the average image read value Rc. In addition, Rct may be set in advance by an experiment using a real machine of the image reading section 100, or the like, and may be stored in a storage unit such as the ROM 24B. However, the invention is not limited thereto, and for example, an average value between Rcmin and Rcmax may be used. Meanwhile, the calculated correction ratio ηc may be temporarily stored in a storage unit such as the RAM 24C.

In the subsequent step S116, a new lighting time tn is calculated using the above-described correction ratio ηc by the following Expression (3).

$$tn = \eta c \cdot to \qquad (3)$$

Here, to denotes an initial value of a lighting time of the LED element of each color or denotes the lighting time tn corrected by the correction ratio ηc which is obtained previously. In addition, tn is calculated with respect to the LED element, which is determined not to fall within the target range in step S112, among the LED elements of the respective colors of the LEDs 160R and 160L. Meanwhile, the calculated lighting time tn may be temporarily stored in a storage unit such as the RAM 24C.

In the subsequent step S118, the lighting time tn for the light source 166 (that is, the LED elements of the respective colors of the LEDs 160R and 160L) is set through the LED driving circuit 162.

In the subsequent step S120, it is determined whether the value of the counter i exceeds an upper limit N1. When the determination is a negative determination, the process proceeds to step S122 to increment the value of the counter i by one and then returns to step S106, and thus the process is executed again from the light source lighting process. The upper limit N1 of the counter i is a value which is provided to prevent a process for converging the light intensity adjustment process by correcting a lighting time and by repeating the acquisition of an average image read value from being trapped in an endless loop without being converged.

On the other hand, when the affirmative determination is made in step S120, the process proceeds to step S124 to execute error processing. This is because there is the possibility of this light intensity adjustment process not being converged. For example, the error processing may be performed by displaying a message such as "the light intensity adjustment of the image reading device cannot be performed" on the UI panel 24E, or an error code may be displayed. Thereafter, this light intensity adjustment process program is terminated.

Subsequently, a black-and-white light intensity adjustment process will be described with reference to FIG. 8. This black-and-white light intensity adjustment process is executed after the above-described color light intensity adjustment process is terminated and the lighting times tc of the LED elements of the respective colors of the LED 160 in the color light intensity adjustment process are calculated.

As shown in FIG. 8, first, in step S200, a value of a counter j is set to 1 to reset the counter j. The counter j is a counter for the number of circulations of a circulating process of changing a lighting time of the light source 166 by a correction ratio and lighting the light source 166 again in steps S214 to S222 which will be described later.

In the subsequent step S202, driving current values for the LED elements of the respective colors R, G, and B of the LED 160R and the LED elements of the respective colors R, G, and B of the LED 160L of the light source 166 are set. In this exemplary embodiment, a uniform driving current value, which is determined in advance for the LED elements of each color, is used as the driving current value. However, the invention is not limited thereto, and driving current values determined for the individual LED elements of the respective colors may be used. Meanwhile, the value set in step S104 may be used as it is as this driving current value.

In the subsequent step S204, initial values t0 of lighting times for the LED elements of the respective colors R, G, and B of the LED 160R and the LED elements of the respective colors R, G, and B of the LED 160L of the light source 166 are calculated by the following Expression (4).

$$t0 = tc/3 \quad (4)$$

The initial values t0 of the lighting times are initial values used in the computation of light intensity adjustment in the following process.

Here, tc collectively denotes six lighting times for color reading which are calculated by the color light intensity adjustment process. In addition, the setting of tc to one-third is for the purpose of adjusting the entire light intensity because all of the LED elements of the respective colors R, G, and B of the LED 160R and the LED elements of the respective colors R, G, and B of the LED 160L of the light source 166 are lit in a case of black-and-white reading. Meanwhile, in this exemplary embodiment, a description is given by illustrating a configuration in which the entire light intensity is adjusted by setting tc to one-third, but is not limited thereto. For example, a configuration may be adopted in which tc is set to one-half and the rest of adjustment is performed by a correction ratio ηbw to be described later.

In the subsequent step S206, the lighting times calculated in step S204 are set through the LED driving circuit 162.

In the subsequent step S208, the light source 166 is lit. As described above, in this step, all of the LED elements of the respective colors R, G, and B of the LED 160R and the LED elements of the respective colors R, G, and B of the LED 160L of the light source 166 are lit. In addition, since the correction of a difference in emission properties of the LED 160R and the LED 160L is executed in the color light intensity adjustment process, the LED 160R and the LED 160L are not also individually lit.

In the subsequent step S210, image read values of the image read region GD of the light detection element 152 are acquired, and an average image read value Rbw is calculated. Since the light source 166 is lit only once, only one average image read value Rbw is acquired.

In the subsequent step S212, it is determined whether the average image read value Rbw calculated in step S210 falls within a target range based on the following Expression (5).

$$Rbw\mathrm{min} \leq Rbw \leq Rbw\mathrm{max} \quad (5)$$

Here, Rbwmin denotes a lower limit of the target range, and Rbwmax denotes an upper limit of the target range. In addition, Rbwmin and Rbwmax may be set in advance by an experiment using a real machine of the image reading section 100, or the like, and may be stored in a storage unit such as the ROM 24B.

When the affirmative determination is made in step S212, the process proceeds to step S226 to store a lighting time to to be described later, which is stored in a storage unit such as the RAM 24C at that point in time, as a lighting time tbw for black-and-white reading in a storage unit such as the NVM 24D. Thereafter, this light intensity adjustment process program is terminated. On the other hand, when the negative determination is made in step S212, the process proceeds to step S214.

In step S214, the correction ratio ηbw of the lighting times of the respective LED elements is calculated by the following Expression (6). The correction ratio ηbw is different from that in the color light intensity adjustment process in that the correction ratio is a common (one) correction ratio for uniformly correcting the lighting times of the respective LED elements. The calculated correction ratio ηbw may be temporarily stored in a storage unit such as the RAM 24C.

$$\eta bw = Rbwt/Rbw \quad (6)$$

Here, Rbwt is a target value of the average image read value Rbw, maybe set in advance by an experiment using a real machine of the image reading section 100, or the like, and may be stored in a storage unit such as the ROM 24B. However, the invention is not limited thereto, and for example, an average value between Rbwmin and Rbwmax may be used. Meanwhile, the calculated correction ratio ηbw may be temporarily stored in a storage unit such as the RAM 24C.

In the subsequent step S216, a new lighting time tn is calculated using the above-described correction ratio ηbw by the following Expression (7).

$$tn = \eta bw \cdot to \quad (7)$$

Here, to denotes the initial value t0 of each lighting time which is calculated in Expression (4) described above, or denotes the lighting time tn corrected by the correction ratio ηbw which is obtained previously. In other words, in the black-and-white light intensity adjustment process, the light intensity adjustment process is executed using the lighting time obtained as an initial value in the color light intensity adjustment process. Six values of tn are calculated with respect to the LED elements of the respective colors of the LEDs 160R and 160L. Meanwhile, the calculated lighting time tn may be temporarily stored in a storage unit such as the RAM 24C.

In the subsequent step S218, the lighting time tn for the light source 166 (that is, the LED elements of the respective colors of the LEDs 160R and 160L) is set through the LED driving circuit 162.

In the subsequent step S220, it is determined whether the value of the counter j exceeds an upper limit N2. When the determination is a negative determination, the process proceeds to step S222 to increment the value of the counter j by one and then returns to step 208, and thus the process is executed again from the light source lighting process. The upper limit N2 of the counter j is a value which is provided to prevent a process for converging the light intensity adjustment process by correcting a lighting time and by repeating the acquisition of an average image read value from being trapped in an endless loop without being converged.

On the other hand, when the affirmative determination is made in step S220, the process proceeds to step S224 to execute error processing. This is because there is the possibility of this light intensity adjustment process not being converged. For example, the error processing may be performed by displaying a message such as "the light intensity adjustment of the image reading device cannot be performed"

on the UI panel 24E. Thereafter, this light intensity adjustment process program is terminated.

The lighting times tc of the LED elements of the respective colors in a case of color reading and the lighting times tbw of the LED elements of the respective colors in a case of black-and-white reading are acquired by executing the above-described light intensity adjustment process program. Subsequently, when an image of the document 118 is read by the image reading section 100, the lighting time tc is used in a case of color reading and the lighting time tbw is used in a case of black-and-white reading. Thus, reproducibility deterioration of image density in a case of the black-and-white reading is suppressed.

Meanwhile, in the above-described exemplary embodiment, a configuration in which one LED is disposed on each of the right and left sides of the light guide 156 is illustrated as the light source 166. However, the invention is not limited thereto, and a configuration in which plural LEDs are disposed may be adopted. In addition, plural light guides may be disposed, and LEDs may be disposed in the respective light guides.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
a light source that includes a unit irradiating an image with light beams of a plurality of colors determined in advance and adjusting light intensities of the respective light beams of the plurality of colors;
a reading unit that reads the image irradiated with the light beams of the plurality of colors from the light source, and outputs the image as image information; and
an adjustment unit that adjusts, for a case where an image is read in color, the light intensities of the respective light beams of the plurality of colors so that values of pieces of image information corresponding to the respective colors, which are output from the reading unit, fall within a first range determined in advance, and adjusts, for a case where an image is read in black and white, the light intensities of the respective light beams of the plurality of colors so that values of pieces of image information output from the reading unit fall within a second range determined in advance, based on the light intensities of the respective light beams of the plurality of colors which are adjusted when the image is read in color.

2. The image reading device according to claim 1, wherein the adjustment unit adjusts, in a case where the image is read in color, the light intensities of the respective light beams of the plurality of colors by irradiating the image with each of the light beams of the plurality of colors so as to output pieces of image information corresponding to the respective plurality of colors from the reading unit, and adjusts, in a case where the image is read in black and white, the light intensities of the respective light beams of the plurality of colors by collectively irradiating the image with the light beams of the plurality of colors so as to output image information from the reading unit.

3. The image reading device according to claim 1, wherein when the image is read in black and white, the adjustment unit adjusts the light intensities of the respective light beams of the plurality of colors so that the values of the pieces of image information output from the reading unit fall within a range determined in advance, by using light intensities, as initial values, based on the light intensities of the respective light beams of the plurality of colors which are adjusted when the image is read in color.

4. The image reading device according to claim 2, wherein when the image is read in black and white, the adjustment unit adjusts the light intensities of the respective light beams of the plurality of colors so that the values of the pieces of image information output from the reading unit fall within a range determined in advance, by using light intensities f as initial values, based on the light intensities of the respective light beams of the plurality of colors which are adjusted when the image is read in color.

5. The image reading device according to claim 3, wherein the adjustment unit calculates the initial values by dividing the light intensities of the respective light beams of the plurality of colors which are adjusted when the image is read in color by the number of plurality of colors.

6. The image reading device according to claim 4, wherein the adjustment unit calculates the initial values by dividing the light intensities of the respective light beams of the plurality of colors which are adjusted when the image is read in color by the number of plurality of colors.

7. The image reading device according to claim 1, wherein the adjustment unit adjusts the light intensities of the respective light beams of the plurality of colors so that a representative value of the pieces of image information corresponding to the respective plurality of colors, which are read and output by a portion of the reading unit, falls within a range determined in advance.

8. The image reading device according to claim 2, wherein the adjustment unit adjusts the light intensities of the respective light beams of the plurality of colors so that a representative value of the pieces of image information corresponding to the respective plurality of colors, which are read and output by a portion of the reading unit, falls within a range determined in advance.

9. The image reading device according to claim 3, wherein the adjustment unit adjusts the light intensities of the respective light beams of the plurality of colors so that a representative value of the pieces of image information corresponding to the respective plurality of colors, which are read and output by a portion of the reading unit, falls within a range determined in advance.

10. The image reading device according to claim 4, wherein the adjustment unit adjusts the light intensities of the respective light beams of the plurality of colors so that a representative value of the pieces of image information corresponding to the respective plurality of colors, which are read and output by a portion of the reading unit, falls within a range determined in advance.

11. The image reading device according to claim 5, wherein the adjustment unit adjusts the light intensities of the respective light beams of the plurality of colors so that a representative value of the pieces of image information corresponding to the respective plurality of colors, which are read and output by a portion of the reading unit, falls within a range determined in advance.

12. The image reading device according to claim 6, wherein the adjustment unit adjusts the light intensities of the respective light beams of the plurality of colors so that a representative value of the pieces of image information corresponding to the respective plurality of colors, which are read and output by a portion of the reading unit, falls within a range determined in advance.

13. The image reading device according to claim 1, wherein the unit adjusting light intensity adjusts light intensity in accordance with lighting times for lighting the respective light beams of the plurality of colors of the light source.

14. The image reading device according claim 1, further comprising:
a color reference section that is colored with a reference color determined in advance,
wherein the adjustment unit adjusts the light intensities of the respective light beams of the plurality of colors when the image is read in color, based on the values of the pieces of image information which are output by causing the reading unit to read the color reference section irradiated with the light beams of the plurality of colors from the light source.

15. The image reading device according to claim 1,
wherein the plurality of colors are three colors of red, green, and blue, and
wherein the reading unit is an image reading unit that reads the image for each line in a sub scanning direction in proximity to the image.

16. An image forming apparatus comprising:
the image reading device according to claim 1; and
an image forming unit that forms an image read by the image reading device on a recording medium.

17. A non-transitory computer readable medium storing an image reading program for controlling an image reading device including: a light source that includes a unit irradiating an image with light beams of a plurality of colors determined in advance and adjusting light intensities of the respective light beams of the plurality of colors i and a reading unit that reads the image irradiated with the light beams of the plurality of colors from the light source, and outputs the image as image information,
the program causing a computer to function as:
an adjustment unit that adjusts, for a case where an image is read in color, the light intensities of the respective light beams of the plurality of colors so that values of pieces of image information corresponding to the respective colors, which are output from the reading unit, fall within a first range determined in advance, and adjusts I for a case where an image is read in black and white, the light intensities of the respective light beams of the plurality of colors so that values of pieces of image information output from the reading unit fall within a second range determined in advance, based on the light intensities of the respective light beams of the plurality of colors which are adjusted when the image is read in color.

18. An image reading device comprising:
a light source that includes a unit irradiating an image with light beams of a plurality of colors determined in advance and adjusting light intensities of the respective light beams of the plurality of colors;
a reading unit that reads the image by causing the image to be simultaneously irradiated with the light beams of the plurality of colors from a plurality of the light sources, and outputs the image as black-and-white image information, and
an adjustment unit that adjusts light intensity when outputting black-and-white image information by simultaneously lighting the light sources of the light beams of the plurality of colors after the light sources of the light beams of the plurality of colors are individually lit.

19. The image reading device according to claim 18, wherein the adjustment unit simultaneously lights the light sources of the light beams of the plurality of colors by individually lighting the light sources of the light beams of the plurality of colors to change the light intensities of the light sources of the plurality of colors and by changing the light intensities of the respective light sources based on the changed light intensities.

20. The image reading device according to claim 19, wherein the reading unit further reads an image by causing the image to be individually irradiated with the light beams of the plurality of colors from the plurality of light sources and outputs the image as color image information, and
wherein the adjustment unit adjusts light intensity when outputting color image information based on the light intensities of the light sources of the respective plurality of colors being changed by individually lighting the light sources of the light beams of the plurality of colors.

* * * * *